(12) United States Patent
Murakawa

(10) Patent No.: US 8,266,675 B2
(45) Date of Patent: Sep. 11, 2012

(54) INFORMATION PROCESSOR, METHOD FOR MANAGING THE SAME AND COMPUTER PROGRAM PRODUCT

(75) Inventor: Akira Murakawa, Toyonaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1449 days.

(21) Appl. No.: 11/372,200

(22) Filed: Mar. 10, 2006

(65) Prior Publication Data

US 2006/0271781 A1 Nov. 30, 2006

(30) Foreign Application Priority Data

May 26, 2005 (JP) ................................. 2005-154397

(51) Int. Cl.
*H04L 29/06* (2006.01)
(52) U.S. Cl. ................. 726/2; 726/21; 726/27; 358/1.1; 358/1.16; 358/3.23; 709/218; 709/223; 709/217; 709/221; 709/226; 399/75; 399/79; 399/80; 399/81; 399/82
(58) Field of Classification Search ................ None
See application file for complete search history.

(56) References Cited

U.S. PATENT DOCUMENTS

| | | | | |
|---|---|---|---|---|
| 5,768,382 A * | 6/1998 | Schneier et al. | ............... | 380/251 |
| 5,784,664 A * | 7/1998 | Nakamura et al. | ................. | 399/8 |
| 6,216,113 B1 * | 4/2001 | Aikens et al. | .................... | 705/34 |
| 6,612,758 B2 * | 9/2003 | Yokoyama | ...................... | 400/70 |
| 6,738,901 B1 * | 5/2004 | Boyles et al. | ................. | 713/159 |
| 7,119,916 B2 * | 10/2006 | Kato et al. | .................... | 358/1.15 |
| 7,286,250 B2 * | 10/2007 | Kujirai et al. | ................. | 358/1.15 |
| 7,443,527 B1 * | 10/2008 | Shigeeda | ..................... | 358/1.15 |
| 7,519,302 B2 * | 4/2009 | Matsuhara | ........................ | 399/8 |
| 7,672,880 B2 * | 3/2010 | Gava | ............................... | 705/30 |
| 7,728,996 B2 * | 6/2010 | Machida | ..................... | 358/1.15 |
| 7,792,601 B2 * | 9/2010 | Okigami | ...................... | 700/100 |

(Continued)

FOREIGN PATENT DOCUMENTS

JP 2000-285077 10/2000

(Continued)

OTHER PUBLICATIONS

Notification of Reason(s) for Refusal in JP 2005-154397 dated Jul. 1, 2008, and English Translation thereof.

*Primary Examiner* — Syed A. Zia
(74) *Attorney, Agent, or Firm* — Buchanan Ingersoll & Rooney PC

(57) ABSTRACT

An information processor is provided that can maintain security in the entire network and use recording media resources efficiently. An image forming apparatus includes a user information memorizing portion for memorizing local user data of users who have ever used the image forming apparatus, a user information deleting portion for deleting any one or more of the local user data when the local user data memorized in the user information memorizing portion has an amount greater than a predetermined value, an authentication request portion for requesting an authentication server to authenticate a user who desires to use the image forming apparatus, and a user information generating portion, when local user data of the user authenticated by the authentication server are not memorized in the user information memorizing portion, for generating local user data of the user in the user information memorizing portion to let the same memorize the generated data.

19 Claims, 11 Drawing Sheets

U.S. PATENT DOCUMENTS

| | | | | |
|---|---|---|---|---|
| 7,809,297 B2* | 10/2010 | Moroi | | 399/80 |
| 7,983,402 B2* | 7/2011 | Ohara et al. | | 379/102.02 |
| 8,064,789 B2* | 11/2011 | Moroi | | 399/80 |
| 8,127,362 B2* | 2/2012 | Asahara | | 726/26 |
| 8,166,542 B2* | 4/2012 | Uno | | 726/21 |
| 2002/0110285 A1* | 8/2002 | Wang et al. | | 382/305 |
| 2003/0030657 A1* | 2/2003 | Kenji | | 345/700 |
| 2003/0142348 A1* | 7/2003 | Hiramatsu et al. | | 358/1.15 |
| 2003/0154413 A1 | 8/2003 | Shigeeda | | |
| 2004/0073514 A1* | 4/2004 | Stefik et al. | | 705/52 |
| 2004/0162890 A1 | 8/2004 | Ohta | | |
| 2005/0057773 A1* | 3/2005 | Buck et al. | | 358/1.15 |
| 2005/0257272 A1* | 11/2005 | Nakao | | 726/26 |
| 2006/0026434 A1* | 2/2006 | Yoshida et al. | | 713/182 |
| 2006/0256370 A1* | 11/2006 | Murakawa | | 358/1.15 |

FOREIGN PATENT DOCUMENTS

| | | |
|---|---|---|
| JP | 2001-282729 | 10/2001 |
| JP | 2003-044442 | 2/2003 |
| JP | 2003-228509 | 8/2003 |
| JP | 2003-345709 | 12/2003 |
| JP | 2004-252510 | 9/2004 |
| JP | 2005-063146 | 3/2005 |

* cited by examiner

| USER ID | PASSWORD |
|---|---:|
| 0001 | 58504 |
| 0002 | 53235 |
| 0003 | 60981 |
| 0004 | 72150 |
| 0005 | 10593 |
| 0006 | 30512 |
| 0007 | 80205 |
| 0008 | 18420 |
| 0009 | 71035 |
| ⋮ | ⋮ |
| 9001 | 82913 |
| 9002 | 20918 |
| 9003 | 49894 |
| 9004 | 22360 |
| 9005 | 93167 |
| ⋮ | ⋮ |

FIG. 6

PLEASE ENTER USER ID AND PASSWORD.

USER ID: ▭

PASSWORD: ▭

| USER ID | ACCESS PRIVILEGE INFORMATION | | | | USE RECORD INFORMATION | | | | |
|---|---|---|---|---|---|---|---|---|---|
| | PRIVILEGE OF COPYING | PRIVILEGE OF SCANNING | PRIVILEGE OF PC PRINT | PRIVILEGE OF FACSIMILE TRANSMISSION | LOGIN SUCCESS COUNT | LOGIN FAILURE COUNT | JOB EXECUTION COUNT | LAST LOGIN DATE AND TIME | |
| 0001 | YES | YES | YES | YES | 10 | 1 | 15 | 2005/05/09 12:15:00 | ~UDT |
| 0002 | YES | NO | NO | YES | 3 | 0 | 7 | 2005/05/09 11:40:30 | ~UDT |
| 0003 | YES | YES | NO | YES | 8 | 2 | 16 | 2005/05/01 09:37:40 | ~UDT |
| 0004 | YES | YES | YES | YES | 15 | 1 | 20 | 2005/05/07 14:30:10 | ~UDT |
| 0005 | NO | NO | NO | YES | 2 | 0 | 3 | 2005/04/10 13:20:15 | ~UDT |
| ... | ... | ... | ... | ... | ... | ... | ... | ... | |
| 9001 | YES | NO | NO | NO | 50 | 3 | 90 | 2005/05/09 13:00:20 | ~UDT |
| 9002 | YES | NO | NO | YES | 30 | 2 | 50 | 2005/05/09 13:15:10 | ~UDT |
| ... | ... | ... | ... | ... | ... | ... | ... | ... | |

USER ID=0001

| EXECUTION DATE AND TIME | TYPE OF PROCESS | THE NUMBER OF PAGES | EXECUTION RESULT |
|---|---|---|---|
| 2005/05/08 16:30:00 | LOGIN | – | SUCCESSFUL |
| 2005/05/08 16:32:10 | COPYING | 5 | SUCCESSFUL |
| 2005/05/08 16:35:15 | FACSIMILE TRANSMISSION | 5 | SUCCESSFUL |
| 2005/05/08 16:40:20 | LOGOUT | – | SUCCESSFUL |
| 2005/05/09 12:15:00 | LOGIN | – | SUCCESSFUL |
| 2005/05/09 12:16:15 | COPYING | 10 | SUCCESSFUL |
| ⋮ | ⋮ | ⋮ | ⋮ |

INFORMATION PROCESSOR, METHOD FOR MANAGING THE SAME AND COMPUTER PROGRAM PRODUCT

This application is based on Japanese Patent Application No. 2005-154397 filed on May 26, 2005, the contents of which are hereby incorporated by reference.

BACKGROUND OF THE INVENTION

1. Field of the Invention

The present invention relates to an information processor such as an MFP that is used as one component of a network.

2. Description of the Related Art

Image processors have recently become widespread that have functions of a copier, a network printer, a scanner, a fax machine or a document server. Such image processors are called multifunction devices, multifunction peripherals (MFP) or the like. The multiple functions expand applications, leading to sharing of image processors by more users.

The functions of a network printer, a scanner, a fax machine and a document server, which are exemplified above, are ones for exchanging data between a device having the functions and other devices via a communication line. The function of a copier enables generation of duplicates of documents with ease, so that the generated duplicates can be brought out. Accordingly, attention must be paid to leakage of confidential information when image processors having any of the functions mentioned above are used in government offices, offices of companies and others.

Information processors such as personal computers and workstations have functions of e-mail, FTP and others. Thus, attention must be given to leakage of confidential information, similarly to the case of image processors.

Effective means for preventing information leakage include management of users based on user accounts. More specifically, each user is given a user account in advance. Users can use image processors or information processors such as personal computers only when each of the users correctly enters an ID and a password of his/her user account to be certified as an authorized user.

It is desirable that authorization for use should be given in a user account depending on attributes, e.g., an occupation, a post, a staff tenure or reliability of a user and that unnecessary authorization for use should not be given. Further, recording a use history for each user account contributes to a follow-up research when a fraud such as information leakage is found. Recording a use history is also psychologically effective because users are discouraged from committing a fraud.

There are proposed methods described in Japanese unexamined patent publications No. 2003-228509, 2003-44442 and 2000-285077 as methods for user authentication. According to the method described in Japanese unexamined patent publication No. 2003-228509, when a user gains access to a function providing part to use any cabinet, authentication information at the first authentication is automatically set as authentication information for using a cabinet this time if the first authentication of the user has been done. Accordingly, in contrast to conventional methods, it is unnecessary for a user to enter authentication information every time when the user uses a cabinet.

According to the method described in Japanese unexamined patent publication No. 2003-44442, a sever includes an authentication data registration table containing biological authentication data for each user. The server performs authentication by comparing biological data that are transmitted by a client with biological authentication data that are memorized in the authentication data registration table and notifies the client of the authentication result.

According to the method described Japanese unexamined patent publication No. 2000-285077, in an information processing system allowing plural users to use plural independent applications, a user information management system is arranged independently of the applications. When an access to a certain application by a user is the first access of the user in the information processing system, the user information of the user is registered in the system. When the access concerned is the second access or after, the user information of the user is collated with already registered user information, and at the time of coincidence, the processing of the accessed application is started. Thus, sharing of user information in plural applications that are independent of each other makes it possible to manage user authentication information and various user information in an integrated manner, leading to improvement in usability for users and reduction in management processes of system administrators.

It is generally desired that user accounts be managed in an integrated manner. If users are given local user accounts for respective information processors within a network, for example, it is troublesome for the users to use the user accounts properly. In addition, it becomes difficult for the users to memorize IDs and passwords in their own user accounts with increasing the number of user accounts given to the users. So, some users may put a memo saying IDs and passwords on desks or some users may neglect regular update of passwords, which increases possibilities of security problems.

Managing all information in an integrated manner, however, may lead to an inefficient use of resources for recording media such as hard disk drives, which are examples of a non-transitory computer readable storage medium. In particular, various types of information processors have recently established a network and various types of resources are provided which are shared by the information processors. Accordingly, if authorization for use pertaining to all information processors is set for all users, the need arises to manage enormous amount of information. Since, however, information processors used by respective users are limited typically, setting authorization for use pertaining to all the information processors for all users may result in an inefficient use of resources for recording media. Beyond that, information regarding a use history for each user may differ in record item depending on image processors. Accordingly, management in an integrated manner makes it difficult to optimize information and may lead to inefficient use of resources for recording media.

As discussed above, from a security standpoint, information should be managed in an integrated manner. In addition, however, it is necessary to use resources for recording media efficiently.

SUMMARY OF THE INVENTION

The present invention is directed to solve the problems pointed out above, and therefore, an object of the present invention is to provide an information processor that includes capabilities of maintaining security in the entire network and of using resources for recording media efficiently.

An information processor according to one aspect of the present invention is an information processor capable of connecting, via a network, to an authentication server that performs user authentication. The information processor includes a user information memorizing portion for memorizing user information pertaining to each user who has ever used the information processor, a user information deleting portion for performing a deletion process to delete any one or more of the user information when the user information memorizing portion memorizes the user information in excess of an amount greater than a predetermined value, an authentication request portion for requesting the authentication server to authenticate a user who desires to use the information processor, and a user information generating portion, when user information of the user who is authenticated by the authentication server is not memorized in the user information memorizing portion, for generating user information of the user in the user information memorizing portion to let the user information memorizing portion memorize the generated user information.

Preferably, the user information deleting portion, in generation of user information by the user information generating portion, performs the deletion process until an amount of the user information memorized in the user information memorizing portion is down to a predetermined value. User information of a user who uses the information processor less often, i.e., user information having the lowest frequency of use is preferentially deleted first.

The user information includes various types of information pertaining to a user, for example, authorization for use given to a user, a history that a user uses an information processor and a user account given to a user.

In the present invention, a "usage count" can be represented by the number of times of user's login to an information processor, the number of times of jobs that an information processor performs responding to user's directions, or others. Further, an "amount of user information" can be indicated by the number of user information memorized in a user information memorizing portion, an amount in bytes, or others.

The present invention makes it possible to provide an information processor that includes capabilities of maintaining security in the entire network and of using resources for recording media efficiently.

These and other characteristics and objects of the present invention will become more apparent by the following descriptions of preferred embodiments with reference to drawings.

BRIEF DESCRIPTION OF THE DRAWINGS

FIG. 5 shows an example of a user account table.

FIG. 6 shows an example of a login screen.

FIG. 8 shows an example of a user information table.

FIG. 9 shows an example of a process history table.

DESCRIPTION OF THE PREFERRED EMBODIMENTS

Figure 1:
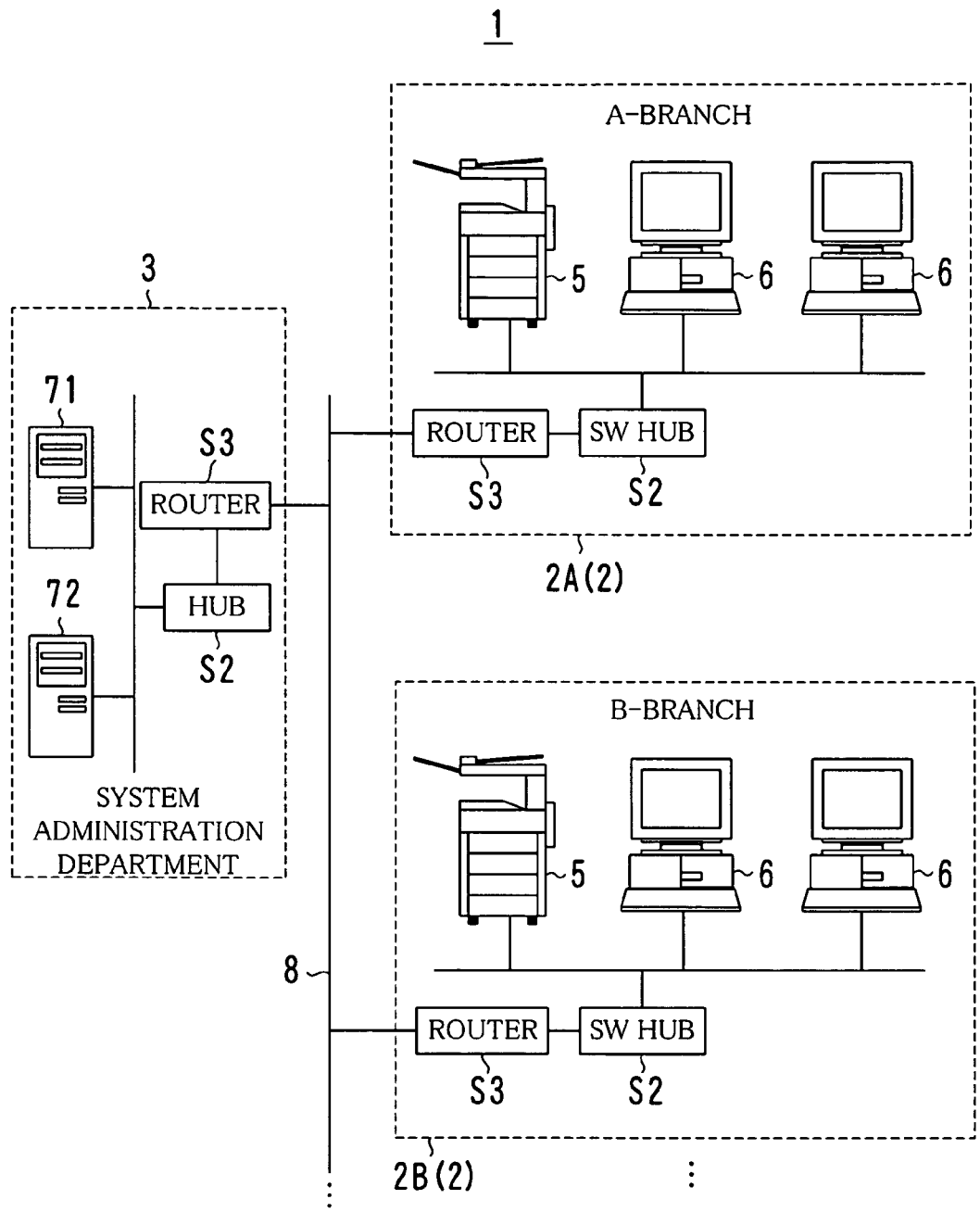
FIG. 1 is a diagram showing an example of an overall configuration of an intranet.
Figure 2:
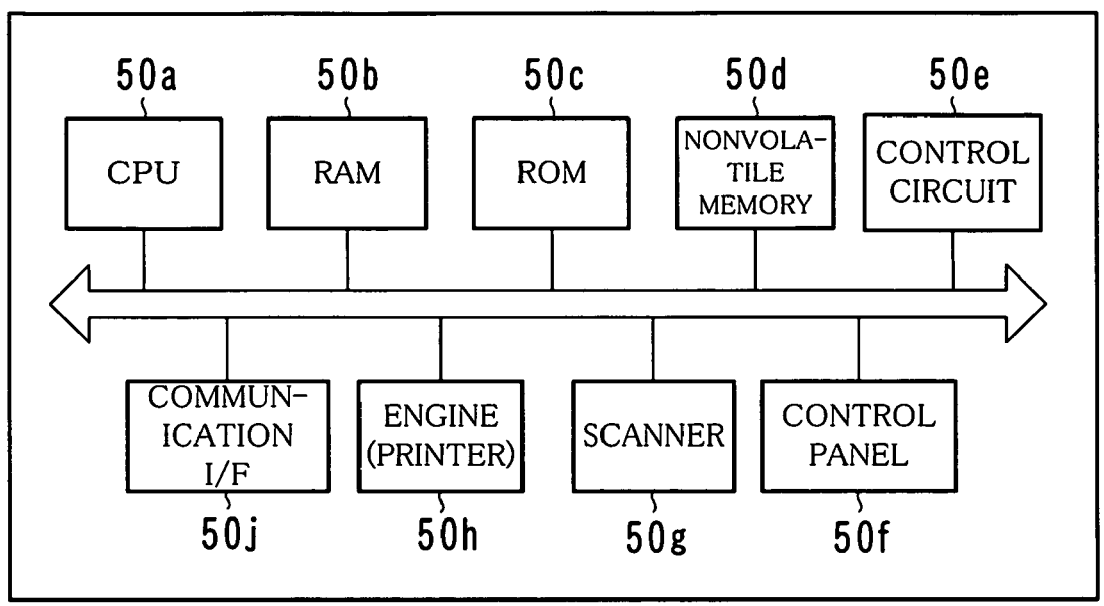
FIG. 2 is a diagram showing an example of a hardware configuration of an image forming apparatus.
Figure 3:
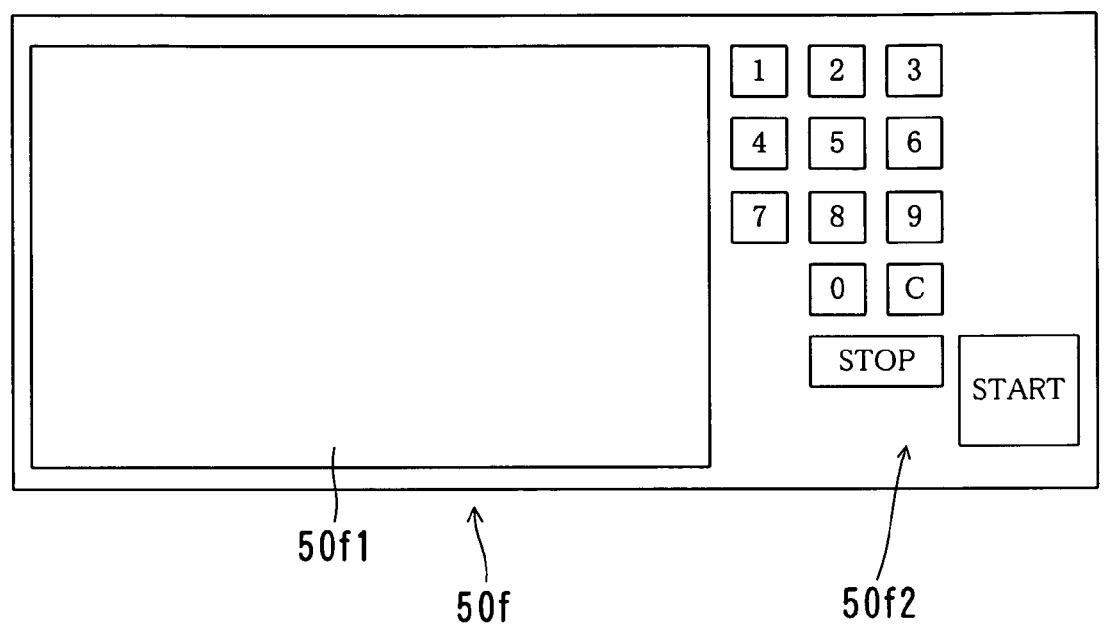
FIG. 3 is a diagram showing an example of a structure of a control panel.
Figure 4:
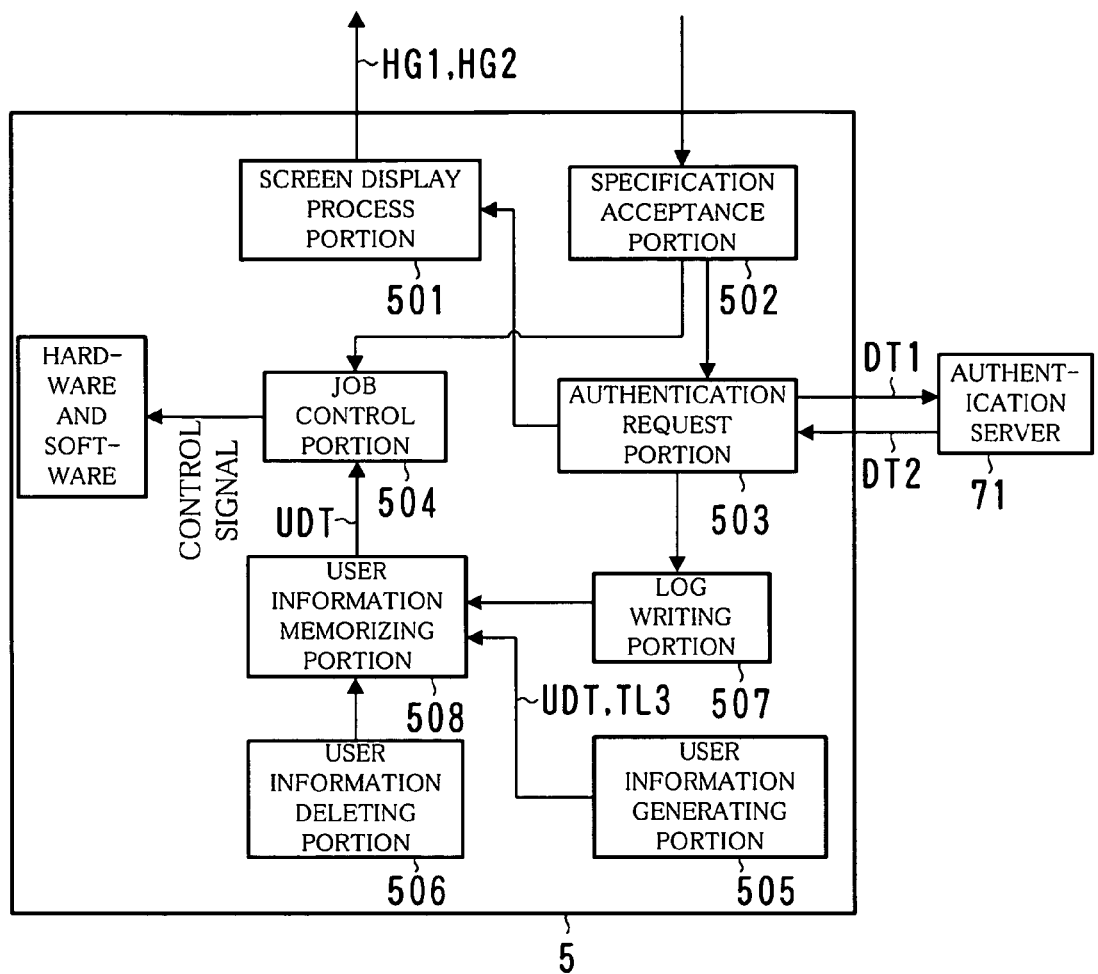
FIG. 4 is a diagram showing an example of a functional structure of the image forming apparatus.

FIG. 1 is a diagram showing an example of an overall configuration of an intranet 1, FIG. 2 is a diagram showing an example of a hardware configuration of an image forming apparatus 5, FIG. 3 is a diagram showing an example of a structure of a control panel 50f, FIG. 4 is a diagram showing an example of a functional structure of the image forming apparatus 5 and FIG. 5 shows an example of a user account table TL1.

The intranet 1 is an intranet within a company including plural branches and a system administration department. Referring to FIG. 1, the intranet 1 includes plural branch networks 2, an administration department network 3 and a communication line 8. A description is given below of an example of the case where the intranet 1 is applied to an X-company including two branches of an A-branch and a B-branch and a system administration department.

The branch network 2 is a Local Area Network (LAN) for branch and is provided for each of the A-branch and the B-branch. Each of the branch networks 2 includes the image forming apparatus 5, terminals 6, a switching hub S2 and a router S3. Hereinafter, for simplification, assume that only one image forming apparatus 5 is installed in one branch.

The image forming apparatus 5 and the terminals 6 are connected to a predetermined port in the switching hub S2 through a twist pair cable. Such a configuration enables the image forming apparatus 5 and the terminals 6 to communicate with each other. A device for wireless LAN may be used as the switching hub S2.

The administration department network 3 is a LAN for system administration and is provided in a system administration department. The administration department network 3 includes an authentication server 71, a Domain Name System (DNS) server 72, a switching hub S2 and a router S3.

The routers 3 provided in the LANs are connected to each other via the communication line 8. Such a configuration enables communication between the devices included in each of the branch networks 2 and the servers included in the administration department network 3. More specifically, the routers 3 are used to connect the branch networks 2 to the administration department network 3. The communication line 8 may be the Internet, a public line or a private line.

The image forming apparatus 5 is an information processor in which functions of a copier, a scanner, a fax machine, a network printer or others are consolidated for performing processes of image information, i.e., an image processor. The image forming apparatus 5 is sometimes called a multifunction device or a multifunction peripheral (MFP). The network printer has a "network printing" function that is for receiving image data from the terminal 6 to print an image on a sheet of paper. Such a function is sometimes called a "network printer function", "PC print function" or the like.

Referring to FIG. 2, the image forming apparatus 5 includes a CPU 50a, a RAM 50b, a ROM 50c, a nonvolatile memory 50d, a control circuit 50e, a control panel 50f, a scanner 50g, a printer 50h and a communication interface 50j.

The scanner 50g is a device for optically reading an image such as a photograph, a character, a picture or a diagram that is depicted on a sheet of the original (hereinafter, sometimes referred to as "the original" simply) to generate image data.

The printer 50h is a device for printing an image on a sheet of paper in accordance with user's commands based on an image captured by the scanner 50g or image data transmitted by the terminal 6.

Referring to FIG. 3, the control panel 50f includes a display 50f1 and a control button unit 50f2 with plural control buttons.

The control button unit 50f2 includes plural keys for entering numerals, characters, symbols or others, a sensor for recognizing pressed keys and a transmission circuit for transmitting a signal indicating a recognized key to the CPU 50a.

The display 50/1 serves to display a screen for giving a message or a direction to a user who operates this image forming apparatus 5, a screen for prompting a user to enter types and conditions of desired processes and a screen for showing an image formed by the image forming apparatus 5 and process results. A touch panel is used as the display 50/1 in this embodiment. Accordingly, the display 50/1 has a function of detecting a position on the touch panel that is touched by a finger of a user to transmit a signal indicative of the detection result to the CPU 50a.

As described above, the control panel 50f plays a role as a user interface for a user who directly operates the image forming apparatus 5. Note that on the terminal 6 are installed application programs for issuing commands to the image forming apparatus 5 and a driver. Thus, a user can operate the image forming apparatus 5 remotely using the terminal 6.

The communication interface 50j shown in FIG. 2 is a Network Interface Card (NIC), a modem or others.

The control circuit 50e is a circuit for controlling devices including the nonvolatile memory 50d, the scanner 50g, the printer 50h, the communication interface 50j and the control panel 50f.

The nonvolatile memory 50d stores programs and data for realizing functions of a screen display process portion 501, a specification acceptance portion 502, an authentication request portion 503, a job control portion 504, a user information generating portion 505, a user information deleting portion 506, a log writing portion 507 and a user information memorizing portion 508. These programs are read out to the RAM 50b as required and the programs are executed by the CPU 50a. All or part of these programs or data may be memorized in the ROM 50c. Alternatively, all or part of the functions shown in FIG. 4 may be realized by the control circuit 50e.

A rewritable and nonvolatile memory such as an EEPROM or a flash memory is used as the nonvolatile memory 50d. The ROM 50c is a read-only memory. Although a ROM is generally included in nonvolatile memories, in the present embodiment, the ROM is distinguished from the EEPROM or the flash memory. Accordingly, the former is referred to as the "ROM 50c", while the latter is referred to as the "nonvolatile memory 50d".

As described above, on the terminal 6 are installed application programs corresponding to the image forming apparatus 5 and a driver. A personal computer, a workstation, a Personal Digital Assistant (PDA) or the like is used as the terminal 6. These devices are examples of non-transitory computer readable storage mediums.

The authentication server 71 is a server for authenticating a user who intends to use the image forming apparatus 5 or the terminal 6. A hard disk drive in the authentication server 71 memorizes the user account table TL1. Each employee is given one user account in the X-company. The user account table TL1 stores, as shown in FIG. 5, user IDs and passwords included in user accounts of respective employees. In addition, the user account table TL1 also stores, on a group basis such as a branch or a department, user IDs and passwords included in user accounts each of which can be shared by employees belonging to one group. The initial number is "0(zero)" for all user IDs included in user accounts that are given to respective employees, while the initial number is "9" for all user IDs included in user accounts that are given to respective groups. Note that an administrator of the authentication server 71 adds new user accounts every time when the number of employees or groups increases and deletes the existing user accounts every time when the number of employees or groups decreases due to resignation of an employee or closure of a group.

The authentication server 71 can be an existing server machine that has a user authentication function. For example, a server machine is used which supports a directory service such as Active Directory provided by Microsoft Corporation or Novell Directory Service (NDS) provided by Novell Inc., and an authentication service such as Windows NT LAN Manager authentication (NTLM).

The DNS server 72 manages information indicative of a correlation between an IP address and a host name of each of the devices including the image forming apparatus 5, the terminal 6, the authentication server 71 and the DNS server 72 within the intranet 1. The DNS server 72 issues a notification of an IP address corresponding to a host name presented by a device that made an inquiry.

Figure 7:
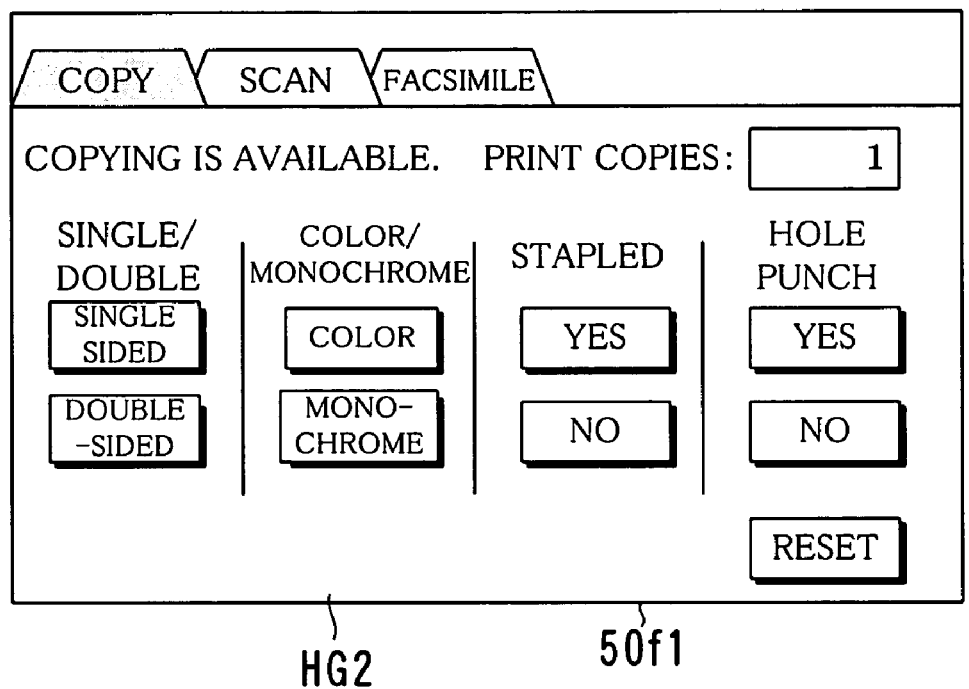
FIG. 7 shows an example of a process specification screen.

FIG. 6 shows an example of a login screen HG1, FIG. 7 shows an example of a process specification screen HG2, FIG. 8 shows an example of a user information table TL2 and FIG. 9 shows an example of a process history table TL3.

Next, detailed descriptions are given of functions and process contents of the portions included in the image forming apparatus 5 and the authentication server 71 shown in FIG. 4.

The screen display process portion 501 makes the display 50/1 of the control panel 50f display a predetermined screen at a predetermined timing. When none logs in to the image forming apparatus 5, for example, the login screen HG1 that is used for entering a user ID and a password is displayed as shown in FIG. 6. After a user logs in, the process specification screen HG2 shown in FIG. 7 is displayed on the display 50/1 depending on a user's operation or a process result. When a user operates, however, the image forming apparatus 5 remotely using the terminal 6, the screen display process portion 501 performs a display process of a screen by transmitting screen data to the terminal 6 used by the user.

The user information memorizing portion 508 memorizes the user information table TL2 and the process history table TL3.

The user information table TL2 stores, as shown in FIG. 8, local user data UDT of users or groups that usually use the image forming apparatus 5 in which the user information table TL2 is provided. More specifically, the user information table TL2 in the image forming apparatus 5 installed in the A-branch mainly stores local user data UDT for employees of the A-branch and groups thereof. The user information table TL2 sometimes stores local user data UDT of an employee who belongs to another branch and visits the A-branch on business.

The user information table TL2 is provided for each of the image forming apparatuses 5. The user information table TL2 is used only in the image forming apparatus 5 where the corresponding user information table TL2 is provided and is not used in other image forming apparatuses 5. More specifically, for example, the user information table TL2 in the image forming apparatus 5 located at the A-branch is not used in the image forming apparatus 5 located at the B-branch. Descriptions will be given later of a method for managing the user information table TL2 and the local user data UDT.

The local user data UDT include data on a user ID, access privilege information and use record information. Stored in a field "user ID" is a user ID included in a user account of an employee or a group to which the local user data UDT are given.

The "access privilege information" represents authorization, which is given to the employee or the group, for using the image forming apparatus 5, i.e., represents local authorization for use. A "privilege of copying" indicates whether a copy function is permitted to be used or not, in other words, whether an image of the original is permitted to be copied on another sheet of paper. When a set value of the "privilege of copying" is indicated as "YES", it means that a user is given the use of a copy function. When it is indicated as "NO", it means that a user is not given the use of a copy function. The meanings of "YES" and "NO" are similar to the use of other functions described below. A "privilege of scanning" indicates whether a scan function is permitted to be used or not, in other words, whether or not an image of the original is permitted to be read to convert the read image into image data (electronic data). A "privilege of PC print" indicates whether or not a function is permitted to be used or not for printing out an image prepared by the terminal 6 using the image forming apparatus 5. A "privilege of facsimile transmission" indicates whether a facsimile transmission function is permitted to be used or not, in other words, whether or not, for example, a function is permitted to be used for transmitting facsimile data to a facsimile terminal located outside the intranet 1.

"Use record information" represents information on records that the image forming apparatus 5 was used by the employee or the group in the past. "Login success count", "login failure count", and "Job execution count" respectively indicate the number of times that the employee or the group logged in to the image forming apparatus 5, the number of times that the employee or the group failed in login and the number of times that the employee or the group made the image forming apparatus 5 execute jobs. These counts may indicate the number of times counted from launching the image forming apparatus 5 or indicate the number of times counted during a predetermined period of time, e.g., during a period from 100 days before to today. A "last login date and time" represents a date and time when the employee or the group has most recently logged in to the image forming apparatus 5. The use record information can be easily obtained from the process history table TL3 that is described in the next paragraph. The use record information is updated appropriately at regular intervals or every time when a predetermined process is performed.

The process history table TL3 is prepared for each user or each group to which local user data UDT are given.

Referring to FIG. 9, the process history table TL3 stores history information (log) of a process that is performed by the image forming apparatus 5 in accordance with commands from the employee or the group. The process history table TL3 is also used only in a local image forming apparatus 5, similarly to the case of the local user data UDT. Accordingly, when a user made the image forming apparatus 5 installed in the A-branch execute a process, for example, history information is stored in the process history table TL3 for the corresponding user that is prepared in the image forming apparatus 5. Further, when a user has local user data UDT both in the image forming apparatus 5 installed in the A-branch and in the image forming apparatus 5 installed in the B-branch, the user has the process history table TL3 in each of both the image forming apparatuses 5.

Referring back to FIG. 4, every time when a process is performed such as a login process, a process pertaining to an image, e.g., copying, scanning, PC printing or facsimile transmission or a logout process, the log writing portion 507 writes a log into the process history table TL3 in a local machine of a user who has issued a command to perform the process.

The specification acceptance portion 502 receives contents that are specified by a user who operates the control panel 50f or the terminal 6. In the situation where the login screen HG1 (see FIG. 6) is displayed, for example, a user who intends to login to the image forming apparatus 5 presses the control button unit 50f2 to specify a user ID and a password and the specification acceptance portion 502 receives the user ID and the password. Further, in the situation where the process specification screen HG2 (see FIG. 7) is displayed, a user who has been logging in to the image forming apparatus 5 presses buttons on the screen to specify process contents and the specification acceptance portion 502 receives the process contents desired by the user. When a user logs in to the image forming apparatus 5 remotely using the terminal 6, the specification acceptance portion 502 receives specified contents via the communication line 8.

When the specification acceptance portion 502 receives a specification of a user ID and a password of a user who intends to login to the image forming apparatus 5, the authentication request portion 503 transmits to the authentication server 71 authentication request information DT1 indicative of the user ID, the password and a command to authenticate the user to request the authentication server 71 to perform a user authentication process.

When receiving the authentication request information DT1 from the image forming apparatus 5, the authentication server 71 performs a user authentication process based on the user ID and the password indicated in the authentication request information DT1. A method itself for performing a user authentication process is similar to conventional methods. More specifically, a user account including the corresponding user ID is searched from the user account table TL1 (see FIG. 5). If a password of the searched user account conforms to a password specified in the received authentication request information DT1, it is determined that the user who intends to login to the image forming apparatus 5 is an authorized user. If not, it is determined that the user is not an authorized user. Additionally, if no user account of the user ID indicated in the authentication request information DT1 is found, it is also determined that the user is not an authorized user.

The authentication server 71 transmits authentication result information DT2 showing a result of the user authentication process to the origin of transmission of the authentication request information DT1, i.e., the image forming apparatus 5 that made the request.

It is possible to use a hash function to convert a password included in the authentication request information DT1, which is to be transmitted from the image forming apparatus 5 to the authentication server 71, into a hash value in order to prevent the password from leaking. In this case, the authentication server 71 converts a password that is stored in the user account table TL1 and is to be compared into a hash value using the same hash function as is used in the image forming apparatus 5. Then, the converted hash value is compared with a hash value included in the authentication request information DT1 and it is determined whether or not the password entered by the user is correct.

When receiving the authentication result information DT2 indicating that the user is an authorized user, the image forming apparatus 5 permits the user, who operated the login screen HG1 to specify the user ID or others, to login. This makes it possible for the user to use the image forming apparatus 5 within the range of authorization given to him/her until he/she logs out. The screen display process portion 501 makes the display 50/1 display a screen for specifying jobs such as the process specification screen HG2. When the user information table TL2 (see FIG. 8) memorizes the local user data UDT for the user, the "last login date and time" of the local user data UDT is updated to a date and time of this login.

The job control portion 504 controls hardware and software in the image forming apparatus 5 in the same way as conventional ways, for example, in the following manner, in order to perform processes in line with process contents (types and conditions of process) that are specified on the process specification screen HG2 by a logged-in user.

It is determined, based on the local user data UDT of the user, whether or not the user is authorized to use functions necessary for performing processes relating to a specification, i.e., the user is given an access privilege or not.

More specifically, when a user specifies (commands) copy execution, for example, a value of the "privilege of copying" of local user data UDT for the user is checked, because a copy function is necessary for the copy execution. It is determined that the user is permitted to use the copy function if the value is "YES". It is determined that the user is not permitted to use the copy function if the value is "NO".

When it is determined that a function is permitted to be used, a job is generated for performing a process pertaining to this specification (command) and is registered in a queue. Then, hardware, software and the like in the intranet 1 are so controlled that a process is performed based on conditions specified by the user when it becomes the turn of the job. In the case of a copy process (a copy job), for example, the scanner 50g is controlled to read an image depicted on the original and the printer 50h is controlled to print the read image on a copy paper.

When it is determined that a function is not permitted to be used, implementation of a process pertaining to this specification is rejected and a message is output indicating that a necessary privilege is not given to the user.

Note that, when a user intends to make the image forming apparatus 5 perform a process other than the copy process, the user can press a tab corresponding to a type of desired process on the process specification screen HG2 to switch displays. The user presses a "scan" tab in order to make the image forming apparatus 5 perform a scanning process. Then, a process specification screen for scanning process is displayed by the screen display process portion 501, so, the user may specify process conditions for scanning on the screen. After the specification, the specification acceptance portion 502 receives a command indicating that a scanning process should be performed and a specification of the process conditions, similarly to the case of a copy process. The job control portion 504 determines that the scanning function is permitted to be used when a value of "YES" is indicated in the "privilege of scanning" in the local user data UDT for the corresponding user. Then, a scan job is generated to perform the scan job appropriately based on the process conditions. When a value of "NO" is indicated, implementation of a process pertaining to this specification is refused.

Similarly, when a user desires facsimile transmission, the user presses a "facsimile" tab to display a process specification screen for facsimile transmission, then to specify desired process contents. Then, the specified process contents or others are accepted. It is determined that the user is permitted to use a facsimile transmission function when a value of "YES" is indicated in the "privilege of facsimile transmission" in the local user data UDT for the user. Then, a facsimile transmission job is generated to perform the facsimile transmission job appropriately based on the process conditions.

Further, when a user intends to make the image forming apparatus 5 perform a so-called PC print process, the user operates the terminal 6 to give the image forming apparatus 5 an execution command and a specification of process conditions. The job control portion 504 determines that the user is permitted to use a PC print function when a value of "YES" is indicated in the "privilege of PC print" in the local user data UDT for the user. Then, a PC print job is generated to perform the PC print job appropriately based on the process conditions.

Meanwhile, as described later, when a user uses the image forming apparatus 5 less often, a case may arise in which the user information deleting portion 506 deletes local user data UDT for the corresponding user from the user information table TL2 in order to save resources. In addition, the user information table TL2 has no local user data UDT for a user who uses the image forming apparatus 5 for the first time. If, however, the user information table TL2 has no local user data UDT for such a user, it is impossible for the job control portion 504 to determine whether a process specified by such a user is permitted to be performed. A case may arise in which the process history table TL3 of a user is not prepared in the image forming apparatus 5 due to the same reason as indicated above. This makes it impossible for the log writing portion 507 to record a log for such a user.

When the user information table TL2 has no local user data UDT for a user who logged in to the image forming apparatus 5 and intends to make it perform a job and the process history table TL3 for such a user is not present, the job control portion 504 issues a command to generate local user data UDT and a process history table TL3 of the user for the user information generating portion 505.

The user information generating portion 505 generates, in accordance with the command issued from the job control portion 504, local user data UDT and a process history table TL3. The local user data UDT are generated, for example, in the following manner.

Firstly, one new record is created in the user information table TL2. A value of a user ID for the user who has been logging in is stored in the field of "user ID" in the created record.

Secondly, a default access privilege that is determined in advance is set in each field of the "access privilege information". Several types of default access privileges may be prepared depending on attributes of the user such as a kind of work, a department, a post or a type of employment. For example, default access privileges may be determined as the following: a default access privilege is "privilege of copying=YES, privilege of scanning=YES, privilege of PC print=YES and privilege of facsimile transmission=YES" for a full-time employee in a branch where the image forming apparatus 5 is installed; a default access privilege is "privilege of copying=YES, privilege of scanning=NO, privilege of PC print=NO and privilege of facsimile transmission=YES" for a full-time employee in another branch; a default access privilege is "privilege of copying=YES, privilege of scanning=NO, privilege of PC print=NO and privilege of facsimile transmission=NO" for a part-time employee. Information indicating user attributes may be memorized in the user account table TL1 in the authentication server 71 and be obtained from the authentication server 71 when local user data UDT are generated. Alternatively, the information indicating user attributes may be obtained from a server for personnel matters.

Lastly, a value indicative of a date and time of this login is stored in the field of "last login date and time" in the "use record information", a value of "1" is stored in the field of "login success count" and a value of "0(zero)" is stored in other respective fields.

In this way, local user data UDT are generated for the user who has been logging in.

Further, the user information generating portion 505 generates a new process history table TL3 for the corresponding user. After generating the process history table TL3, the log writing portion 507 writes a log indicative of process contents of this login into the process history table TL3.

Even if the user information generating portion 505 generates a new local user data UDT and a new process history table TL3, a case may arise in which they can not be memorized due to insufficient free space on the nonvolatile memory 50d or on a memory area that is set as an area for memorizing user information, i.e., the user information memorizing portion 508. Further, even if they can be memorized, a case may arise in which a certain free space should be left on the nonvolatile memory 50d for other applications. The user information deleting portion 506 deletes, for such occasions, one or more existing local user data UDT and one or more existing process history tables TL3 associated therewith so that the local user data UDT and the process history table TL3 are kept at a predetermined number and predetermined amount when the number of local user data UDT registered in the user information table TL2 exceeds a predetermined number or when data amount of the local user data UDT and the process history table TL3 exceeds a predetermined amount.

At the time of deletion, local user data UDT and a process history table TL3 for a user who uses the image forming apparatus 5 less often are preferentially selected as ones to be deleted. For example, local user data UDT having the smallest value of "last login date and time" and the corresponding process history table TL3 are preferentially deleted first. It may be possible to preferentially delete local user data UDT having the smallest value of "job execution count" first or to preferentially delete local user data UDT having the smallest value of "login success count" first. In alternative ways, a function is prepared that has parameters of the day and time and the counts mentioned above and is used for calculating frequency of use, so that local user data UDT having the lowest frequency of use is preferentially deleted first.

Figure 10:
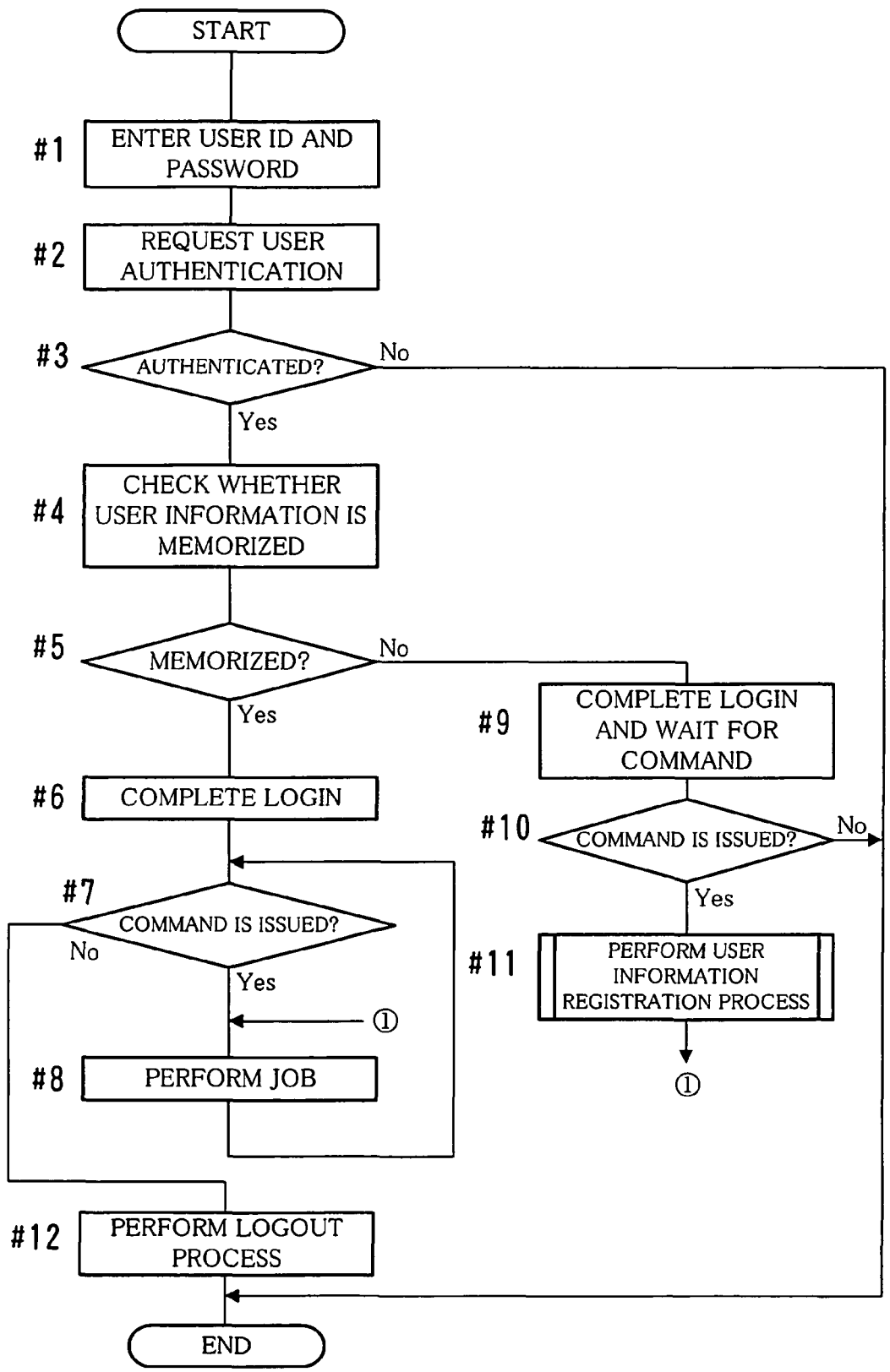
FIG. 10 is a flowchart showing an example of a flow of the entire process in the image forming apparatus.
Figure 11:
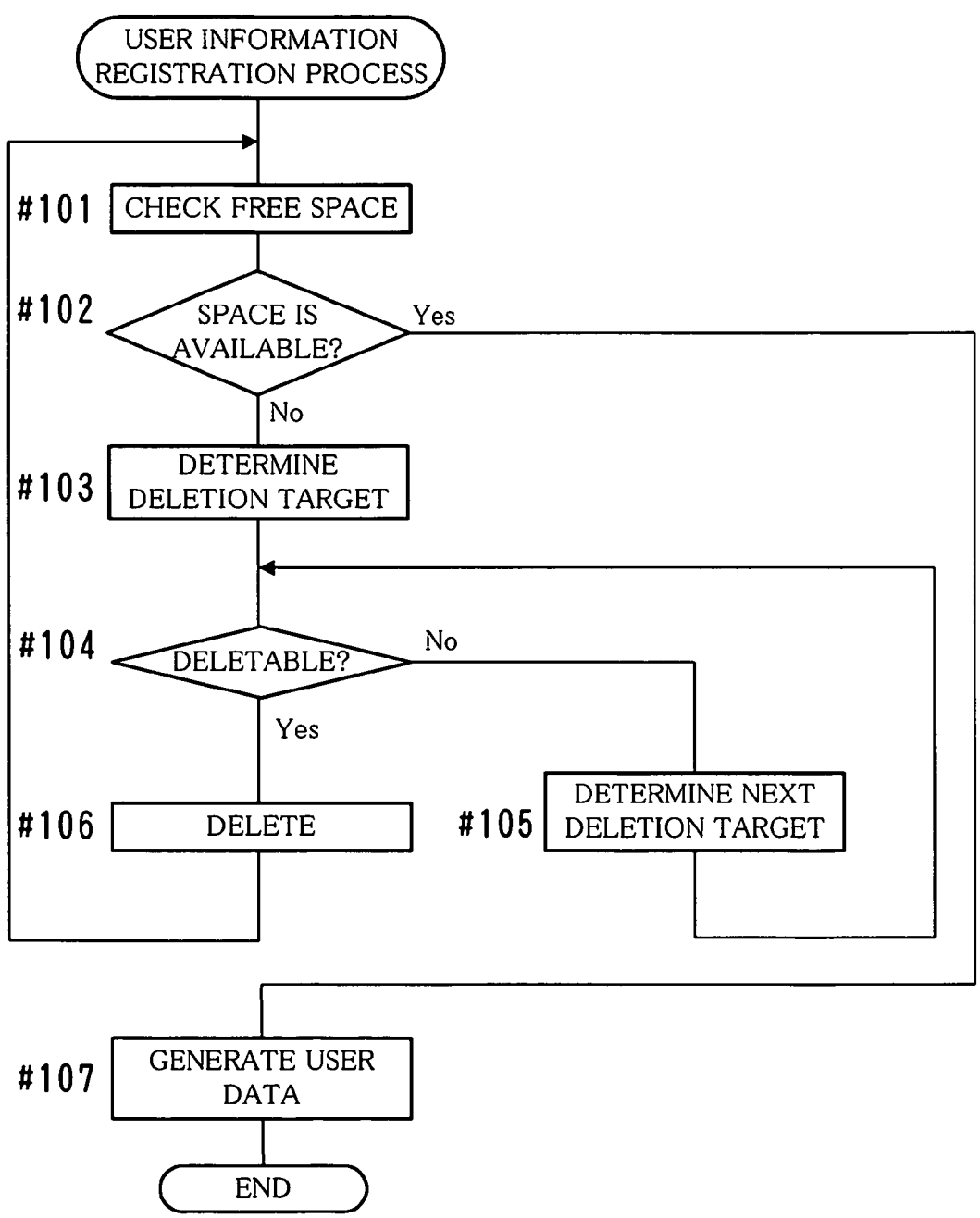
FIG. 11 is a flowchart showing an example of a flow of a user information registration process.

FIG. 10 is a flowchart showing an example of a flow of the entire process in the image forming apparatus 5 and FIG. 11 is a flowchart showing an example of a flow of a user information registration process. Note that the CPU 50a executes a control operation for processes of the flowcharts described below in accordance with programs stored in the nonvolatile memory 50d in the image forming apparatus 5.

Next, a description is given, with reference to the flowcharts, of process flows in the image forming apparatus 5 from login to logout of a user.

When receiving a user ID and a password specified by a user (#1), the image forming apparatus 5 requests the authentication server 71 to authenticate the user (#2). When the authentication server 71 verifies that the user is an authorized user (Yes in #3), it is checked whether or not local user data UDT and a process history table TL3 for the user are memorized in the image forming apparatus 5, i.e., in the local machine (#4).

When they are memorized (Yes in #5), the user is allowed to login to the image forming apparatus 5, similarly to the case of conventional ways, and a screen such as the process specification screen HG2 shown in FIG. 7 is displayed to wait for commands from the user (#6). Every time when the user issues a command to perform a process (Yes in #7), the process is performed responding to the command (#8). In the case where the local user data UDT of the user do not specify authorization necessary to perform the process, the process execution is refused. When the user enters a command to logout or when the user does not operate the image forming apparatus 5 during a predetermined time of period (No in #7), a logout process is performed (#12).

Further, when the local user data UDT and others of the authenticated user are not memorized (No in #5), a login operation is completed in the meantime, to wait for commands from the user (#9). When the user issues a command to perform a process (Yes in #10), local user data UDT and a process history table TL3 for the user are generated (#11) prior to performing the process (#8).

The procedure shown in FIG. 11 enables the generation process of local user data UDT and a process history table TL3 in Step #11. Referring to FIG. 11, the image forming apparatus 5 checks a free space on the nonvolatile memory 50d or a free space on a memory area that is set to memorize user information (#101). When a value of the free space equals to or more than a predetermined value (Yes in #102), a new record is added to the user information table TL2 (see FIG. 8) and predetermined values, which are described earlier, are stored in respective fields of the added record. Thus, local user data UDT for the user are generated and, further, a process history table TL3 for the user is generated (#107).

When a value of the free space is lower than a predetermined value (No in #102), local user data UDT and process history tables TL3 for any users that are currently registered are deleted in the following manner. Local user data UDT to be preferentially deleted first are determined based on predetermined rules (#103). As described earlier, according to the predetermined rules, local user data UDT to be preferentially deleted first are, for example, local user data UDT having the smallest value of last login date and time, local user data UDT having the smallest value of job execution count or local user data UDT having the smallest value of login success count.

When the determined local user data UDT can be deleted (Yes in #104), it is deleted from the user information table TL2 and a process history table TL3 corresponding to the local user data UDT, i.e., for the same user is deleted (#106). When the determined local user data UDT cannot be deleted (No in #104), the local user data UDT and the corresponding process history table TL3 are eliminated from deletion targets and local user data UDT are determined that have the next highest priority as deletion targets (#105). Setting in advance is possible of eliminating from deletion targets local user data UDT and a process history table TL3 for a user having predetermined attributions (an administrator of the image forming apparatus 5 or a supervisory employee, for example).

After deleting the local user data UDT, processing goes back to Step #101 to check a free space again. When a value of the free space is still lower than a predetermined value (No in #102), processing of Steps #103 through #106 are performed repeatedly. When a value of the free space equals to or more than a predetermined value (Yes in #102), a process is performed for generating local user data UDT and a process history table TL3 (#107).

Further, in the case where the total of registered local user data UDT and the total of registered process history tables TL3 respectively equal to or more than a predetermined number, a deletion operation may be performed in accordance with the rules described above so that the registration numbers fall within a predetermined number.

With reference back to FIG. 10, a process is performed appropriately in accordance with commands from a user (#8), similarly to conventional ways, after generating local user data LDT and a process history table TL3 until the user logs out. In the case, however, where no jobs are performed from after generating them until the user logs out due to the reason that the user desires performance of jobs but has no authorization for use, it is possible to delete the generated local user data UDT and the generated process history table TL3.

Every time when processes such as login, copying and logout are performed during a period from Step #1 through Step #12, logs of these processes are recorded properly in the process history table TL3 for the user.

According to this embodiment, user accounts are managed by the authentication server 71 in an integrated manner and information on authorization for use and information on use history for each user are managed individually for each image forming apparatus 5. Each of the image forming apparatuses 5 memorizes only information of users who have ever used the image forming apparatus 5 and appropriately deletes information of a user who uses the image forming apparatus 5 less frequently. Accordingly, recording medium resources can be used efficiently with security of the entire intranet 1 maintained. In addition, an administrator enters user accounts only in the authentication server 71, reducing workloads of the administrator.

In this embodiment, the image forming apparatus 5 memorizes, as information on a user, the local user data UDT indicating authorization for use and statistics of use records of a user and the process history table TL3 indicating a use history of a user. It is possible, however, for the image forming apparatus 5 to memorize information other than the local user data UDT and the process history table TL3. For example, a password of a user may be obtained from the authentication server 71 and be memorized with being correlated with a user ID. Then, when problems including communication failure occur, the image forming apparatus 5 may perform user authentication in logging in thereto of a user, instead of the authentication server 71. In other words, when external authentication is impossible, a password can be used to realize internal authentication.

A configuration is possible in which a user account of an employee (user) who works only in a branch and does not work in other places is managed in an image forming apparatus 5 installed in the branch and the image forming apparatus 5 performs user authentication of the user. In this way, external authentication performed by the authentication server 71 is separated from internal authentication performed by each of the image forming apparatuses 5. Thereby, even when a user is added who is employed only for a short period, an administrator of the image forming apparatus 5 installed in the branch can flexibly create and delete a user account without bothering an administrator of the authentication server 71.

It is possible to update access privilege information of local user data UDT of a user in such a manner to expand or restrict authorization for use depending on a use record of the user. For example, when the login success count or the job execution count exceeds a predetermined number, authorization for use can be expanded. When the login failure count exceeds a predetermined number, authorization for use can be restricted.

According to the present embodiment, frequency that a user uses the image forming apparatus 5 is determined by the number of times of job execution. It is possible, however, to determine the frequency based on other information. For example, determination is possible based on the number of pages that were used for copying or printing or the number of pages of the scanned original. The total value of these pages may be used for determination of the frequency.

A configuration is possible in which some methods are prepared for choosing local user data UDT to be deleted and an administrator can select any method depending on use environment of the image forming apparatus 5. For example, under the environment where a user is charged in accordance with usage of the image forming apparatus 5 and fees are calculated at regular intervals for collection, a method may be adopted of preferentially selecting as deletion targets local user data UDT and a process history table TL3 for a user who has never used the image forming apparatus 5 since fees are collected last time. Alternatively, under the environment where a process history table TL3 is backed up regularly in a storage recording medium such as a Digital Audio Tape (DAT) or a CD-ROM, a method may be adopted of preferentially selecting as deletion targets local user data UDT and a process history table TL3 for a user whose last login date and time is old. For the purpose of improving security, a method is effective of preferentially selecting as a deletion target local user data UDT and others for a user who has a high value in the login failure count or a user who has a high ratio of the login failure count to the login success count.

In this embodiment, the description is given of the case where a user uses an image forming apparatus 5 as an information processor. The present invention can be, however, applied to an information processor such as a personal computer or a workstation.

In this embodiment, the description is given of the case where the image forming apparatus 5, the authentication server 71 and others are provided in the intranet 1. The present invention can be, however, applied to a network of other organization or group such as an office, a school or a hospital.

Configurations, processing contents of each part or whole part of the intranet 1 and the image forming apparatus 5, contents of user information, processing order, table contents, a method of authenticating a user and others can be varied as required within the scope of the present invention.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. An image processing apparatus capable of connecting, via a communication line, to an authentication server that memorizes first user account information and performs user authentication based on the memorized first user account information, the image processing apparatus comprising:
   a user information memorizing portion for memorizing access privilege information indicating authorization to use a function of the image processing apparatus for each user who has ever used the image processing apparatus;
   a user information deleting portion for automatically deleting at least one of the memorized access privilege information when the user information memorizing portion memorizes the access privilege information in excess of a predetermined value;
   an authentication request portion for requesting the authentication server to authenticate a user who desires to use the image processing apparatus;
   an access privilege information generating portion, when access privilege information of the user who is authenticated by the authentication server is not memorized in the user information memorizing portion, for automatically generating the access privilege information of the authenticated user to let the user information memorizing portion memorize the generated access privilege information; and
   a job control portion determining whether the function specified by the authenticated user is permitted or not based on the access privilege information corresponding to the authenticated user.

2. The image processing apparatus according to claim 1, wherein the user information deleting portion, when the access privilege information generating portion generates the access privilege information, automatically deletes memorized access privilege information until an amount of the access privilege information memorized in the user information memorizing portion is down to a predetermined value.

3. The image processing apparatus according to claim 1, wherein
the user information memorizing portion further memorizes a usage count for each user indicating the number of times that each authenticated user has used the image processing apparatus during a predetermined period of time, and
the user information deleting portion automatically deletes the access privilege information corresponding to a user whose usage count is the smallest among the memorized usage count.

4. The image processing apparatus according to claim 1, wherein
the user information memorizing portion further memorizes a last login date and time for each user that the authenticated user has logged in to the image processing apparatus most recently, and
the user information deleting portion automatically deletes the access privilege information corresponding to a user whose last login date and time is the most previous among the memorized last login date and time.

5. The image processing apparatus according to claim 3, further comprising a user information update portion for updating the usage count corresponding to the authenticated user, every time when a process is performed based on a command from the authenticated user.

6. The image processing apparatus according to claim 4, further comprising a user information update portion for updating a last login date and time corresponding to the authenticated user, every time when a process is performed based on a command from the authenticated user.

7. The image processing apparatus according to claim 1, further comprising a user authentication process portion for authenticating a user in place of the authentication server when a communication between the image processing apparatus and the authentication server is impossible, wherein
the user information memorizing portion further memorizes second user account information indicating a password for each user, and
the user authentication process portion performs the user authentication based on the memorized password and a password entered by the user who desires to use the image processing apparatus.

8. A method for managing an image processing apparatus capable of connecting, via a communication line, to an authentication server that memorizes first user account information and performs user authentication based on the memorized first user account information, the method comprising:
letting a user information memorizing portion memorize access privilege information indicating authorization to use a function of the image processing apparatus for each user who has ever used the image processing apparatus; and
letting the image processing apparatus perform a first process, a second process, a third process and a fourth process when a user desires to use the image processing apparatus,
the first process being a process of requesting the authentication server to authenticate the user,
the second process being a process of automatically generating, when the authentication server verifies that the user is an authorized user and the access privilege information of the user is not memorized in the user information memorizing portion, access privilege information of the authenticated user to let the user information memorizing portion memorize the generated access privilege information,
the third process being a process of automatically deleting at least one memorized user information other than the generated access privilege information of the user from the user information memorizing portion when the user information memorizing portion memorizes the access privilege information in excess of a predetermined value, and
the fourth process being a process of determining whether the function specified by the authenticated user is permitted or not based on the access privilege information corresponding to the authenticated user.

9. The method according to claim 8, wherein, in letting the image processing apparatus perform the second process, the third process is performed until an amount of the access privilege information memorized in the user information memorizing portion is down to a predetermined value.

10. The method according to claim 8, wherein
the user information memorizing portion further memorizes a usage count for each user indicating the number of times that each authenticated user has used the image processing apparatus during a predetermined period of time, and
the third process involves automatically deleting the access privilege information corresponding to a user whose usage count is the smallest among the memorized usage count.

11. The method according to claim 8, wherein
the user information memorizing portion further memorizes a last login date and time for each user that the authenticated user has logged in to the image processing apparatus most recently, and
the third process involves automatically deleting the access privilege information corresponding to a user whose last login date and time is the most previous among the memorized last login date and time.

12. The method according to claim 10, further comprising letting the image processing apparatus perform a fifth process for updating the usage count corresponding to the authenticated user, every time when a process is performed based on a command from the authenticated user.

13. The method according to claim 11, further comprising letting the image processing apparatus perform a fifth process for updating a last login date and time corresponding to the authenticated user, every time when a process is performed based on a command from the authenticated user.

14. The method according to claim 8, further comprising
letting the image processing apparatus perform a sixth process of authenticating a user in place of the authentication server when a communication between the image processing apparatus and the authentication server is impossible, wherein
the user information memorizing portion further memorizes second user account information indicating a password for each user, and
the first process involves performing the user authentication based on the memorized password and a password entered by the user who desires to use the image processing apparatus.

15. A non-transitory computer readable storage medium storing a computer program used for an image processing apparatus that includes a user information memorizing portion for memorizing access privilege information indicating authorization to use a function of the image processing apparatus for each user, the program making the image processing apparatus perform processing of:
when a user desires to use the image processing apparatus, requesting an authentication server, which is connected via a communication line to the image processing apparatus and memorizes first user account information, to authenticate the user based on the memorized first user account information;
automatically generating, when the authentication server verifies that the user is an authorized user and the access privilege information of the user is not memorized in the user information memorizing portion, access privilege information of the authenticated user to let the user information memorizing portion memorize the generated access privilege information;
automatically deleting at least one memorized user information other than the generated access privilege information of the user from the user information memorizing portion when the user information memorizing portion memorizes the access privilege information in excess of a predetermined value; and
determining whether the function specified by the authenticated user is permitted or not based on the access privilege information corresponding to the authenticated user.

16. The image processing apparatus according to claim 1, wherein the access privilege information generating portion generates the access privilege information of the authenticated user when the authenticated user issues a command to perform a process prior to performing the specified function.

17. The image processing apparatus according to claim 16, wherein the user information deleting portion deletes the generated access privilege information when no job is performed after generating the access privilege because the authenticated user has no authorization for the specified function.

18. The method according to claim 8, wherein the second process generates the access privilege information of the authenticated user when the authenticated user issues a command to perform a process prior to performing the specified function.

19. The method according to claim 18, wherein the third process deletes the generated access privilege information when no job is performed after generating the access privilege because the authenticated user has no authorization for the specified function.

* * * * *